(12) United States Patent
Yamada (10) Patent No.: US 7,010,075 B2
(45) Date of Patent: Mar. 7, 2006

(54) SAMPLING SYSTEM (75) Inventor: Kunihiro Yamada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 604 days.

(21) Appl. No.: 10/308,196

(22) Filed: Dec. 3, 2002

(65) Prior Publication Data
US 2003/0118139 A1 Jun. 26, 2003

Related U.S. Application Data (63) Continuation of application No. 09/295,317, filed on Apr. 21, 1999, now Pat. No. 6,501,811.

(30) Foreign Application Priority Data

Apr. 24, 1998 (JP) .............................. 10-131282

(51) Int. Cl.
H04L 25/00 (2006.01)
H04L 25/40 (2006.01)
H04L 7/00 (2006.01)
(52) U.S. Cl. ...................... 375/371; 375/355
(58) Field of Classification Search ............... 375/371, 375/355; 713/400, 401, 503; 327/91, 94; 370/503, 516, 517
See application file for complete search history.

(56) References Cited

U.S. PATENT DOCUMENTS

| 4,253,184 A | 2/1981 | Gitlin et al. | |
| 4,577,334 A | 3/1986 | Boer et al. | |
| 5,017,924 A * | 5/1991 | Guiberteau et al. | 342/195 |
| 5,490,174 A | 2/1996 | Shin et al. | |
| 5,513,209 A | 4/1996 | Holm | |
| 5,737,589 A * | 4/1998 | Doi et al. | 713/503 |
| 5,920,209 A * | 7/1999 | Kusumoto et al. | 327/91 |

FOREIGN PATENT DOCUMENTS

JP 8-510100 10/1996

* cited by examiner

Primary Examiner—Phuong Phu
(74) Attorney, Agent, or Firm—Dickstein Shapiro Morin & Oshinsky LLP (57) ABSTRACT A sampling system includes a first sampler which periodically samples an input signal at a fixed sampling period T to output a sequence of samples. A first lowpass filter outputs a sequence of $-T/4$ phase shifted samples from the sequence of samples. A second lowpass filter outputs a sequence of $+T/4$ phase shifted samples from the sequence of samples. A second sampler outputs a sequence of secondary samples by alternately taking the $-T/4$ phase shifted samples supplied by the first lowpass filter and the $+T/4$ phase shifted samples supplied by the second lowpass filter at, a sampling period that is half the sampling period T, the second sampler doubling the number of the samples output by the first sampler. An interpolation circuit outputs at the sampling period T a sequence of output samples by executing an interpolation of the sequence of secondary samples output by the second sampler, the sequence of output samples having a timing phase synchronized to a given arbitrary clock signal.

9 Claims, 4 Drawing Sheets

ORIGINAL

FIG. 2B

-T/4 SHIFTED

FIG. 2C

+T/4 SHIFTED

FIG. 2D

DOUBLED

SAMPLING SYSTEM

This application is a continuation of U.S. patent application Ser. No. 09/295,317 filed on Apr. 21, 1999, now U.S. Pat. No. 6,501,811 the entire disclosure of which is hereby incorporated by reference.

BACKGROUND OF THE INVENTION (1) Field of the Invention

The present invention relates to a sampling system which achieves timing recovery in sampling an input signal that is received at a receiving part of a modem. When sampling the received signal, symbol synchronization and carrier synchronization must be derived at the receiving part of the modem, and the present invention particularly relates to the symbol synchronization for the timing recovery.

(2) Description of the Related Art

It is well known that symbol synchronization at a receiving part of a modem when sampling a received signal is important for achieving timing recovery. It is required that in the modem a symbol rate (or baud rate) "fbr" of a received signal and its phase are matched with a symbol rate "fbt" of a transmitted signal and its phase. Usually, the transmitter and the receiver are distant via a communication channel, and a system clock of the transmitter and a system clock of the receiver are independent of each other. The receiving part of the modem is required to derive from the received signal an estimated symbol rate "fbr" that is very close to the system clock frequency and has an arbitrary amount of a timing phase with respect to the system clock phase.

Generally, the received signal is sampled periodically at a sampling rate "fsr" that is a multiple of the symbol rate "fbr", and subjected to demodulation. The sampling of the received signal is also called analog-to-digital (AD) conversion. In a case of a full-duplex modem, the transmitting operation is controlled by the transmitting part of the modem and the receiving operation is controlled by the receiving part of the modem. That is, in the full-duplex modem in which the receiving part and the transmitting part are concurrently operating, the signal to be transmitted to a communication channel is sampled periodically at a sampling rate "fsr" that is a multiple of the symbol rate "fbr". The sampling of the transmitted signal is also called digital-to-analog (DA) conversion.

In the full-duplex modem, there is a problem in that the sampling rate "fsr" and its phase at the receiving part and the sampling rate "fsr" and its phase at the transmitting part are generally not consistent. It is required that in the full-duplex modem the AD conversion and the DA conversion are independently controlled at timings which are different from each other. Because of this, in a conventional analog front-end LSI, the AD converter and the DA converter are constructed into separate units which independently operate at timings which are different from each other.

Further, in a conventional modem, the AD converter requires an external logic circuit which controls the timing phase of a clock signal. In addition, in a conventional modem, the AD conversion and the DA conversion are independently controlled at timings which are different from each other. It is impossible that a clock signal is shared for the DA conversion in the transmission part at the time of transmission and for the AD conversion in the receiving part at the time of receiving.

Figure 4:
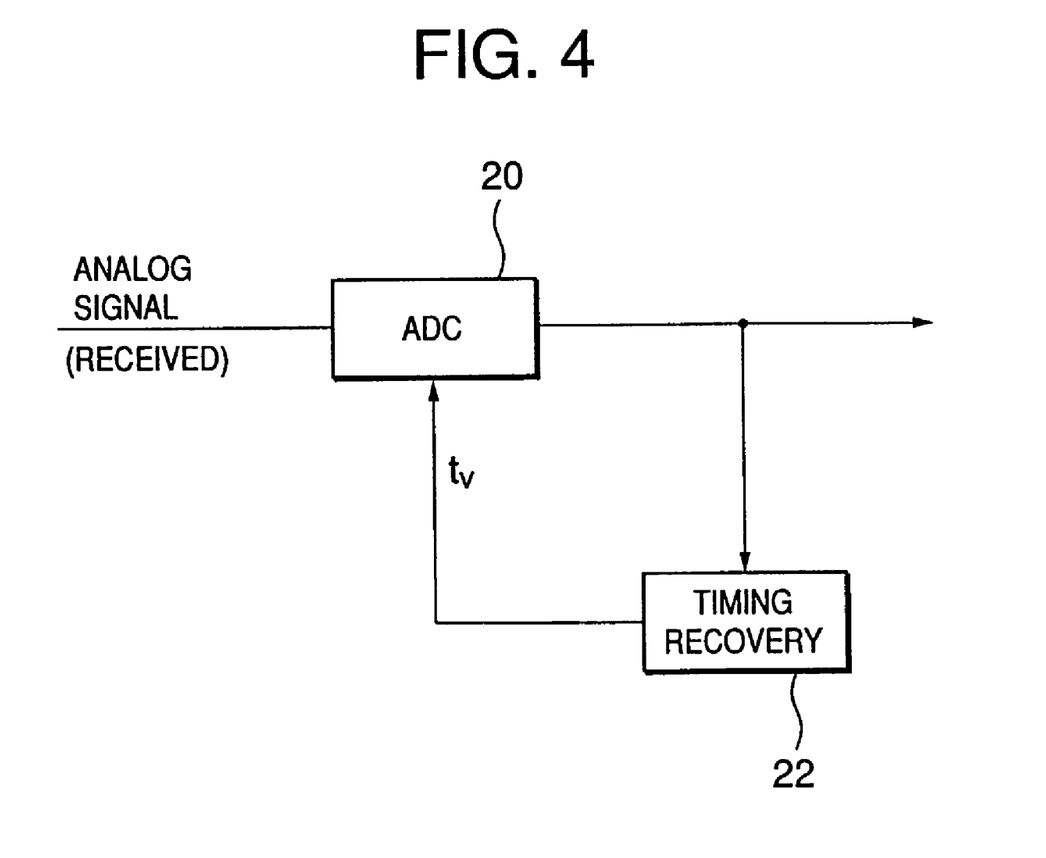
FIG. 4 is a diagram showing an AD converter in a receiving part of a conventional modem.

FIG. 4 shows an AD converter in a receiving part of a conventional modem. As shown in FIG. 4, the receiving part of the conventional modem includes an AD converter (ADC) 20 which converts a received analog signal into a digital signal. A timing recovery unit 22 generates an estimated timing signal based on the digital signal output by the AD converter 20. The timing recovery unit 22 outputs a timing phase signal (tv) to the AD converter 20.

In the receiving part of the conventional modem of FIG. 4, the AD converter 20 requires the timing recovery unit 22 and a variable clock oscillator which are constructed with an external logic circuit. Further, it is impossible that a clock signal is shared for the DA conversion in the transmitting part of the conventional modem at the time of transmission and for the AD conversion in the receiving part of the conventional modem at the time of receiving. In the transmitting part (not shown in FIG. 4) of the conventional modem of FIG. 4, a DA converter for the DA conversion at the time of transmission requires a separate timing recovery unit and a separate variable clock oscillator. The separate variable clock oscillator outputs a clock signal to the DA converter, the timing phase of this clock signal being different from that determined by the estimated timing of the timing recovery unit 22 in the receiving part of the conventional modem of FIG. 4.

Japanese Laid-Open Patent Application No. 8-510100 (which is a national-phase publication of a translation of International Application No. PCT/US94/01755) discloses a resampling system in which the AD conversion is controlled at an estimated timing phase. The sequence of input samples after the AD conversion is subjected to smoothing so that the sampling rate is temporarily raised to a high sampling rate. The sequence of samples after the smoothing is subjected to the resampling. The temporarily raised sampling rate is lowered by the resampling in order to derive an estimated timing of the samples.

In the resampling method of the above publication, the smoothing is simply carried out but it is impossible to obtain a steep high-frequency cutoff characteristic. When the necessity arises, it is required to insert an additional lowpass filter in the resampling system. The characteristics obtained by the smoothing need corrections, and it is difficult to obtain an ideal frequency response even if an additional lowpass filter is provided. Such a lowpass filter will be complicated, and it is unavoidable that some characteristics are sacrificed.

In the resampling system of the above publication, a transversal filter of a type, which is constituted by a set of weighting coefficients, is used to carry out the interpolation. The amount of the computations on the transversal filter is relatively small, but it is necessary to provide a different set of weighting coefficients for each of interpolated timing phases. This makes the capacity of a ROM (read-only memory), which is needed for storing the different sets of weighting coefficients, significantly large. However, generally, the capacity of a storage device in a sampling system is limited. Hence, it is necessary to construct the resampling system of the above publication at the expense of the resolution of interpolated timing phases as the capacity of the storage of the weighting coefficients is limited.

SUMMARY OF THE INVENTION

An object of the present invention is to provide an improved sampling system in which the above-described problems are eliminated.

Another object of the present invention is to provide a sampling system which allows a clock signal with a precise timing phase to be shared for the DA conversion in the transmitting part of a modem at the time of transmission and for the AD conversion in the receiving part of the modem at the time of receiving.

Still another object of the present invention is to provide a sampling system which does not require an external logic circuit to obtain a clock signal with a precise timing phase for controlling the receiving part of the modem.

The above-mentioned objects of the present invention are achieved by a sampling system including: a first sampler which periodically samples an input signal at a fixed sampling period T to output a sequence of samples; a first lowpass filter which outputs a sequence of −T/4 phase shifted samples from the sequence of samples output by the first sampler; a second lowpass filter which outputs a sequence of +T/4 phase shifted samples from the sequence of samples output by the first sampler; a second sampler which outputs a sequence of secondary samples by alternately taking the −T/4 phase shifted samples supplied by the first lowpass filter and the +T/4 phase shifted samples supplied by the second lowpass filter at a sampling period that is half the fixed sampling period T, the second sampler doubling the number of the samples output by the first sampler; and an interpolation circuit which outputs at the fixed sampling period T a sequence of output samples by executing an interpolation of the sequence of secondary samples output by the second sampler, the sequence of output samples having a timing phase synchronized to a given arbitrary clock signal.

In the sampling system of the present invention, the second sampler outputs a sequence of secondary samples by alternately taking the −T/4 phase shifted samples from the first lowpass filter and the +T/4 phase shifted samples from the second lowpass filter at a sampling period that is half the fixed sampling period T, the second sampler doubling the number of the samples output by the first sampler. The interpolation circuit outputs at the fixed sampling period T a sequence of output samples by executing an interpolation of the sequence of secondary samples, the sequence of output samples having a timing phase synchronized to a given arbitrary clock signal. The sampling system of the present invention does not require an external logic circuit to obtain a clock signal with a precise timing phase for controlling the receiving part of the modem. Even when an AD converter which periodically samples an input signal at a fixed sampling period is incorporated in the receiving part of the modem, the sampling system of the present invention can provide a precise timing phase of the clock signal for the receiving part of the modem. The sampling system of the present invention makes it possible to share a clock signal with a precise timing phase for the DA conversion in the transmitting part of the modem at the time of transmission and for the AD conversion in the receiving part of the modem at the time of receiving.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENT

A description will now be given of the preferred embodiment of the present invention with reference to the accompanying drawings.

Figure 1:
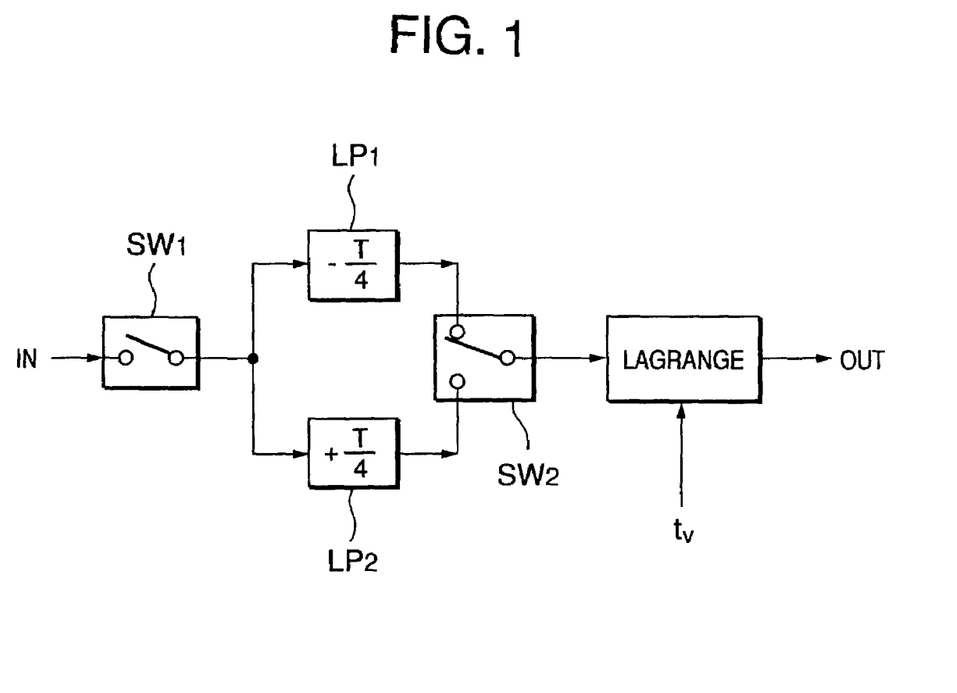
FIG. 1 is a block diagram of a sampling system embodying the present invention.

FIG. 1 shows a sampling system embodying the present invention.

As shown in FIG. 1, the sampling system of the present embodiment includes a first sampler SW1, a first lowpass filter LP1, a second lowpass filter LP2, a second sampler SW2, and a Lagrange's interpolation circuit LAGRANGE. An input signal IN is an analog signal which is received at a receiving part of a modem, and this input signal IN is supplied to the first sampler SW1. The first sampler SW1 periodically samples the input signal IN at a fixed sampling period T to output a sequence of original samples. Usually, the first sampler SW1 is constituted by an AD converter. The sequence of original samples output by the first sampler SW1 is supplied to each of the first lowpass filter LP1 and the second lowpass filter LP2.

The first lowpass filter LP1 outputs a sequence of −T/4 phase shifted samples from the sequence of original samples output by the first sampler SW1. The second lowpass filter LP2 outputs a sequence of +T/4 phase shifted samples from the sequence of original samples output by the first sampler SW1.

Each of the first lowpass filter LP1 and the second lowpass filter LP2 acts to cut off the frequency components of the input signal IN in the range between $\alpha/2T$ and $1/2T$ ($0<<\alpha<1$). In the present embodiment, each of the lowpass filters LP1 and LP2 is constituted by a known linear transversal filter. The sequence of −T/4 phase shifted samples output by the first lowpass filter LP1 is supplied to a first input of the second sampler SW2. The sequence of +T/4 phase shifted samples output by the second lowpass filter LP2 is supplied to a second input of the second sampler SW2.

The second sampler SW2 outputs a sequence of secondary samples by alternately taking the −T/4 phase shifted samples supplied by the first lowpass filter LP1 and the +T/4 phase shifted samples supplied by the second lowpass filter LP2 at a sampling period that is half the fixed sampling period T. The second sampler SW2 doubles the number of the original samples output by the first sampler SW1. The sequence of secondary samples output by the second sampler SW2 is supplied to the Lagrange's interpolation circuit LAGRANGE.

The Lagrange's interpolation circuit LAGRANGE outputs at the fixed sampling period T a sequence of output samples by executing a Lagrange's interpolation of the sequence of secondary samples output by the second sampler SW2. As shown in FIG. 1, a given arbitrary clock signal "t" from an external circuit is supplied to the interpolation circuit LAGRANGE. The sequence of output samples at the output of the interpolation circuit LAGRANGE has a timing phase synchronized to the given arbitrary clock signal.

As described above, in the present embodiment, each of the lowpass filters LP1 and LP2 is constituted by a known linear transversal filter. The linear transversal filter (or the lowpass filters LP1 and LP2) is constituted by a number of tapped delay lines, with the tappings spaced a symbol period (T) apart. In the linear transversal filter, the current and past values of the input signal are linearly weighted by the filter coefficients (also called the tap coefficients) and summed to produce the output. The samples of the received signal are stored in a shift register. In the sampling system of the present embodiment, the first lowpass filter LP1 outputs a sequence of −T/4 phase-shifted samples from the sequence of initial samples at the output of the first sampler SW1. The second lowpass filter LP2 outputs a sequence of +T/4 phase-shifted samples from the sequence of initial samples at the output of the first sampler SW1.

The output of each of the lowpass filters LP1 and LP2 (or the linear transversal filter) in the present embodiment is represented by $$LP1: S(-T/4) = \sum_{i=0}^{k-1} c(k-i) \cdot d(i)$$

$$LP2: S(+T/4) = \sum_{i=0}^{k-1} c(i) \cdot d(i)$$

where c(i) denotes the tap coefficients, S is the output of the filter, d(i) is the input received signal at time i·T, and k is the number of taps. It should be noted that the tap coefficients of the first lowpass filter LP1 and the tap coefficients of the second lowpass filter LP2 are arranged in a symmetrical formation.

Generally, in an AD converter, the sampling frequency is preset to a relatively low frequency such that it is matched to the band of an analog signal to the AD converter. In a conventional sampling system, a sequence of samples is obtained at the output of such an AD converter and it is supplied to a LAGRANGE's interpolation circuit. In such a case, very high order computations must be performed on the LAGRANGE's interpolation circuit in order to output a sequence of output samples with an adequately high level of precision of the interpolation. Not only the amount of the computations may be significantly large, but also the amount of computational errors may be significantly large.

However, in the sampling system of the present embodiment, the first and second lowpass filters LP1 and LP2 and the second sampler SW2 produce the sequence of secondary samples in which the −T/4 phase shifted samples and the +T/4 phase shifted samples are combined together, at the output of the second sampler SW2. The bandwidth is restricted to the range between 0 and α/2T (0<<α<1) by the lowpass filters LP1 and LP2, and the number of the original samples output by the first sampler SW1 is doubled to the sequence of secondary samples by the second sampler SW2. The sampling system of the present embodiment makes the waveform of secondary samples output to the Lagrange's interpolation circuit LAGRANGE remarkably smooth over the waveform of the original samples. It is possible for the sampling system of the present embodiment to obtain the waveform of secondary samples that is more closer to the waveform of the input signal IN than the waveform of the original samples. Further, in the sequence of secondary samples at the output of the second sampler SW2, the frequency components in the range between 1/2T and 1/T are cut off. More specifically, the high-frequency cutoff characteristics of the lowpass filters LP1 and LP2 allow the frequency components in the range between α/2T and 1/T to be removed from the sequence of secondary samples.

In the sampling system of the present embodiment, the sequence of secondary samples having such a smooth waveform is output to the Lagrange's interpolation circuit LAGRANGE. Even when relatively low order computations are performed on the LAGRANGE's interpolation circuit, the sequence of output samples having an adequately high level of precision of the interpolation can be produced at the output of the LAGRANGE's interpolation circuit.

Next, an operation of the LAGRANGE's interpolation circuit LAGRANGE will be explained.

A general form of the LAGRANGE's interpolation equation executed by the LAGRANGE's interpolation circuit LAGRANGE is as follows.

$$y(u) = \sum_{i=0}^{n} \left( y(i) \prod_{j=0, j \neq i}^{n} \frac{u-j}{i-j} \right) \quad (1)$$

where y(i) denotes the value of an output sample at a time instant "i", the time instant "i" is the time count ranging from 0 to "n", and y(u) denotes the value of an interpolation at a given arbitrary time "u" obtained from the "(n+1)" output samples. In a practical case, the arbitrary time "u" which is approximately equal to "n/2" is selected for the sake of simplicity in obtaining a reasonable level of precision of the interpolation.

Generally, in considering an interpolation of samples periodically obtained at a sampling period T, it is convenient to normalize the sampling period T to 1 and take the interpolation over the normalized sampling time period t (0≦t<1). The normalized sampling time period t is also called a timing phase. In the following, the interpolation over the timing phase t (0≦t<1) is executed based on the LAGRANGE's interpolation equation.

Suppose a case in which the computations of 3rd order LAGRANGE's interpolation (n=3) are executed by the LAGRANGE's interpolation circuit. When n=3, the LAGRANGE's interpolation circuit takes the four past values of the signal (or the four secondary samples at the output of the second sampler SW2) to execute the computations. In the present embodiment, the sampling period of the second sampler SW2 is half the fixed sampling period T of the first sampler SW1. In the above equation (1), the following condition is assumed, $$u=2t \quad (2)$$

In the present case, the arbitrary time "u" which is approximated to around the middle point over the four past samples is selected for the sake of simplicity in obtaining a reasonable level of precision of the interpolation. The above equation (1) is rewritten into $$0 \leq u < 1 \quad y(u) = \sum_{i=-1}^{2} \left( y(i) \prod_{j=-1, j \neq i}^{2} \frac{u-j}{i-j} \right) \quad (3)$$

$$1 \leq u < 2 \quad y(u) = \sum_{i=0}^{3} \left( y(i) \prod_{j=0, j \neq i}^{3} \frac{u-j}{i-j} \right) \quad (4)$$

If the following substitution $$u'=u-1 \quad (5)$$

is made to the above equation (4), then the result is, $$y(u') = \sum_{i=-1}^{2}\left(y(i+1)\prod_{j=-1,j\neq i}^{2}\frac{u'-j}{i-j}\right) \quad (6)$$

The computations of the above equation (6) are essentially the same as the computations of the above equation (3) except that the four past samples taken by the above equation (6) are delayed from those taken by the above equation (3) by one sampling period. Therefore, it can be understood that the LAGRANGE's interpolation circuit in the sampling system of the present embodiment is required to include "n+2" delay lines which act to store the "n+2" past samples. In the present case (n=3), the LAGRANGE's interpolation circuit is required to include five delay lines only. Further, it can be understood that the computations of the above equations (2), (3), (5) and (6) are attained by utilizing a known digital signal processor (DSP).

In the above equation (1), the denominators "(i–j)" are always constant numbers, regardless of the given arbitrary time "u" for the interpolation, and the product of the denominators with respect to each of the time instants "i" is a constant value. Actually, the following product of the denominators is the result of a multiplication in which the preceding product of the denominators is multiplied by a constant value. The term inside the parentheses of the above equation (1) is calculated by such (n+2) multiplications with respect to each of the time instants "i". Therefore, the calculations of the right side of the above equation (1) are attained by the (n+1)·(n+2) multiplications.

The right side of the above equation (1) includes subtractions/additions, but a multiplication and a subtraction/addition are concurrently executed by a general DSP (digital signal processor). Hence, the time of the entire calculations of the right side of the above equation (1) can be estimated by the execution of the (n+1)·(n+2) multiplications on the general DSP.

Suppose the case of n=30 in which the calculations of a simple Lagrange's interpolation equation are executed and the sampling system of the present invention is not applied. In order to obtain the value of an interpolation at a given arbitrary time "u", the number of the required multiplications in this case is:

(n+1)·(n+2)=31×32=992.

On the other hand, if a transversal filter, consisting of 30 tapped delay lines, is used for each of the lowpass filters LP1 and LP2 of the present embodiment, the calculations of the +T/4 or –T/4 phase shifting of the samples in each transversal filter are attained by 30 multiplications. The two transversal filters are required to execute a total of 60 multiplications to output the phase shifted samples. Suppose a case in which the computations of 5th order LAGRANGE's interpolation (n=5) are executed by the LAGRANGE's interpolation circuit of the present embodiment. In this case, the LAGRANGE's interpolation circuit needs (5+1)·(5+2) multiplications, or 42 multiplications. Hence, in order to obtain the value of an interpolation at a given arbitrary time "u", the total number of the multiplications by the sampling system of the present embodiment is: 60+42=102.

Accordingly, the sampling system of the present embodiment is remarkably effective in reducing the computational time and efforts on the Lagrange's interpolation circuit. The inventor has conducted a detailed simulation to prove this. As a result of the simulation, it has been found that the above-mentioned example of the sampling system of the present invention results in an adequately high level of precision of the interpolation by executing the calculation of the 5th order LAGRANGE's interpolation with two 30-tapped transversal filters, while the case of the simple Lagrange's interpolation requires 50th order computations in order to attain the same level of precision of the interpolation.

Further, the sampling system of the present invention is effective in minimizing the change of frequency response associated with the changes of interpolation accuracy and timing phase. It is possible for the sampling system of the present invention to maintain an adequately high level of precision of the interpolation without sacrificing the resolution of interpolated timing phases.

FIG. 2A, FIG. 2B, FIG. 2C and FIG. 2D are time charts for explaining an operation of the sampling system of FIG. 1.

For the sake of simplicity of the description of the operation of the sampling system of the present embodiment, the time instants T0, T1, T2, . . . at which the corresponding samples are taken along the time axis shown in FIG. 2A through FIG. 2D, are properly adjusted such that the time instants are consistent with each other.

Figure 2A:
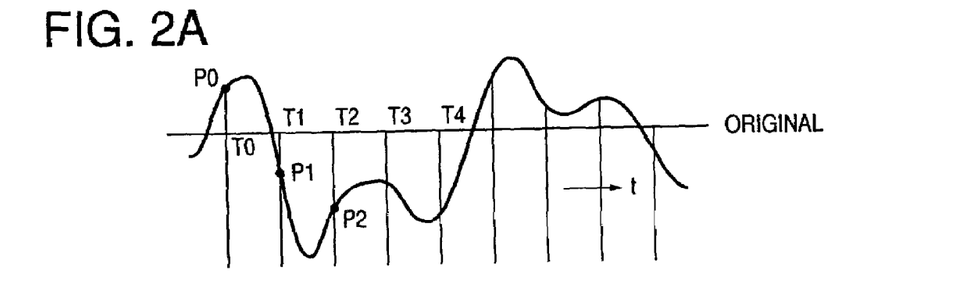
FIG. 2A, FIG. 2B, FIG. 2C and FIG. 2D are time charts for explaining an operation of the sampling system of FIG. 1.

FIG. 2A shows a waveform of an intermediate signal at the output of the first sampler SW1 in the sampling system of FIG. 1. As shown in FIG. 2A, the first sampler SW1 outputs a sequence of original samples P0, P1, P2, . . . , at sampling time instants T0, T1, T2, . . . which periodically occur at a fixed sampling period T. A continuous waveform which is formed by tracing the original samples P0, P1, P2 indicated in FIG. 2A correspond to the waveform of the input analog signal IN in FIG. 1.

Figure 2B:
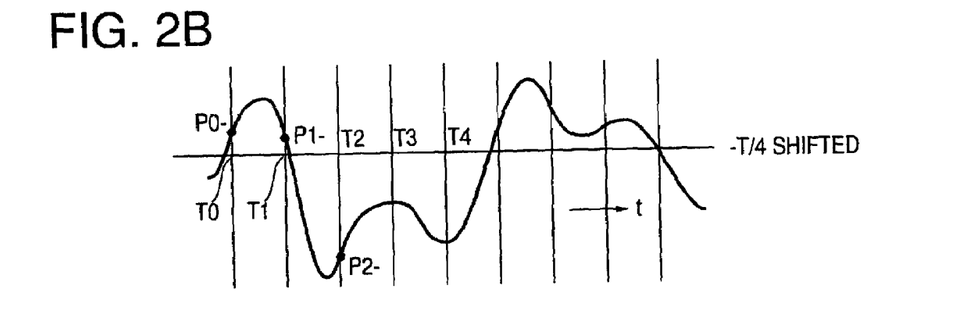

FIG. 2B shows a waveform of an intermediate signal at the output of the first lowpass filter LP1 in the sampling system of FIG. 1. As shown in FIG. 2B, the first lowpass filter LP1 outputs a sequence of –T/4 phase shifted samples P0–, P1–, P2–, . . . , from the sequence of original samples P0, P1, P2, . . . , output by the first sampler SW1. The time instants T0, T1, T2, . . . at which the corresponding samples are taken along the time axis shown in FIG. 2B are properly adjusted such that the time instants of FIG. 2A and FIG. 2B are consistent with each other. The continuous waveform shown in FIG. 2B does not actually appear at the output of the first lowpass filter LP1, but it is illustrated for the purpose of comparison with the waveform of the input signal IN at the input of the first sampler SW1.

Figure 2C:
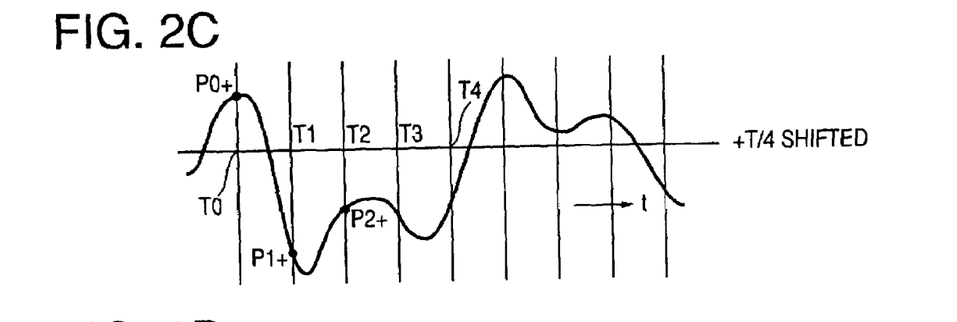

Similarly, FIG. 2C shows a waveform of an intermediate signal at the output of the second lowpass filter LP2 in the sampling system of FIG. 1. As shown in FIG. 2C, the second lowpass filter LP2 outputs a sequence of +T/4 phase shifted samples P0+, P1+, P2+, . . . , from the sequence of original samples P0, P1, P2, . . . , output by the first sampler SW1. The time instants T0, T1, T2, . . . at which the corresponding samples are taken along the time axis shown in FIG. 2C are properly adjusted such that the time instants of FIG. 2A and FIG. 2C are consistent with each other. The continuous waveform shown in FIG. 2C does not actually appear at the output of the second lowpass filter LP2, but it is illustrated for the purpose of comparison with the waveform of the input signal IN at the input of the first sampler SW1.

Figure 2D:
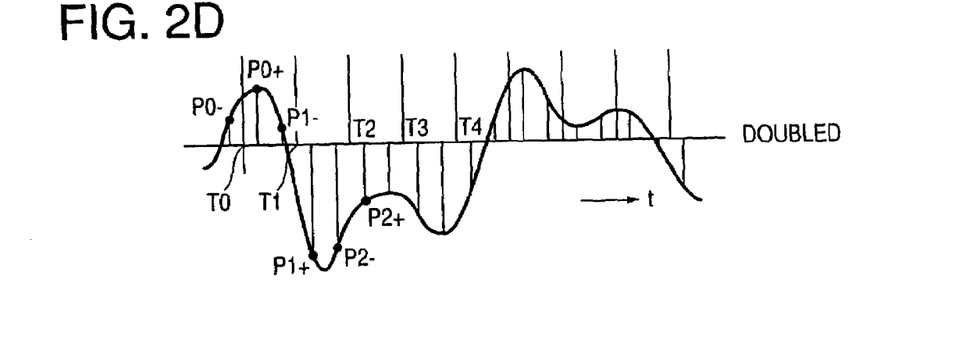

FIG. 2D shows a waveform of an intermediate signal at the output of the second sampler SW2. As shown in FIG. 2D, the second sampler SW2 outputs a sequence of secondary samples P0−, P0+, P1−, P1+, P2−, P2+, . . . by alternately taking the −T/4 phase shifted samples P0−, P1−, P2−, . . . supplied by the first lowpass filter LP1 and the +T/4 phase shifted samples P0+, P1+, P2+, . . . supplied by the second lowpass filter LP2 at the sampling period that is half the fixed sampling period T. The second sampler SW2 doubles the number of the original samples P0, P1 , P2, . . . output by the first sampler SW1.

The continuous waveform shown in FIG. 2D does not actually appear at the output of the second sampler SW2, but it is illustrated for the purpose of comparison with the waveform of the input signal IN at the input of the first sampler SW1. It can be understood that the first and second samplers SW1 and SW2 and the first and second lowpass filters LP1 and LP2 in the sampling system of the present embodiment are required to include respective delay lines which hold the "n+2" past samples. The time instants T0, T1, T2, . . . at which the corresponding samples are taken along the time axis shown in FIG. 2D are properly adjusted such that the time instants of FIG. 2A and FIG. 2D are consistent with each other. It can be clearly understood from FIG. 2D how and in what manner the second sampler SW2 converts the sequence of original samples P0, P1, P2, . . . at the output of the first sampler SW1 (or the AD converter) into the sequence of secondary samples P0−, P0+, P1−, P1+, P2−, P2+, . . . at the output of the second sampler SW2.

By comparing the sequence of original samples P0, P1, P2, . . . shown in FIG. 2A (or the output of the first sampler SW1) with the sequence of secondary samples P0−, P0+, P1−, P1+, P2−, P2+, . . . shown in FIG. 2D (or the output of the second sampler SW2), it is clearly understood that the waveform of secondary samples output to the Lagrange's interpolation circuit LAGRANGE is made remarkably smooth over the waveform of the original samples. It is possible for the sampling system of the present embodiment to easily obtain an estimation of the waveform of secondary samples that is more closer to the waveform of the input signal IN than the waveform of the original samples.

In the case of the sequence of original samples shown in FIG. 2A, it is necessary to perform very high order computations on the LAGRANGE's interpolation circuit LAGRANGE in order to output a sequence of output samples (for example, when interpolating a valley portion of the waveform between the time instants T1 and T2) with a high level of precision of the interpolation. Conversely, in the case of the sequence of secondary samples shown in FIG. 2D, even if relatively low order computations are performed on the LAGRANGE's interpolation circuit LAGRANGE, the sequence of output samples having an adequately high level of precision of the interpolation can be produced by the LAGRANGE's interpolation circuit.

Suppose that the sampling system embodying the present invention is applied to a V.34 modem as a practical example, and the sampling rate of the first sampler SW1 in such modem is 9600 samples per second. It has been found that the sequence of secondary samples of FIG. 2D allows 5th order computations on the LAGRANGE's interpolation circuit to result in an adequately high level of precision of the interpolation, while the sequence of original samples of FIG. 2A requires about 50th order or higher order computations on the LAGRANGE's interpolation circuit in order to attain an adequately high level of precision of the interpolation.

Figure 3:
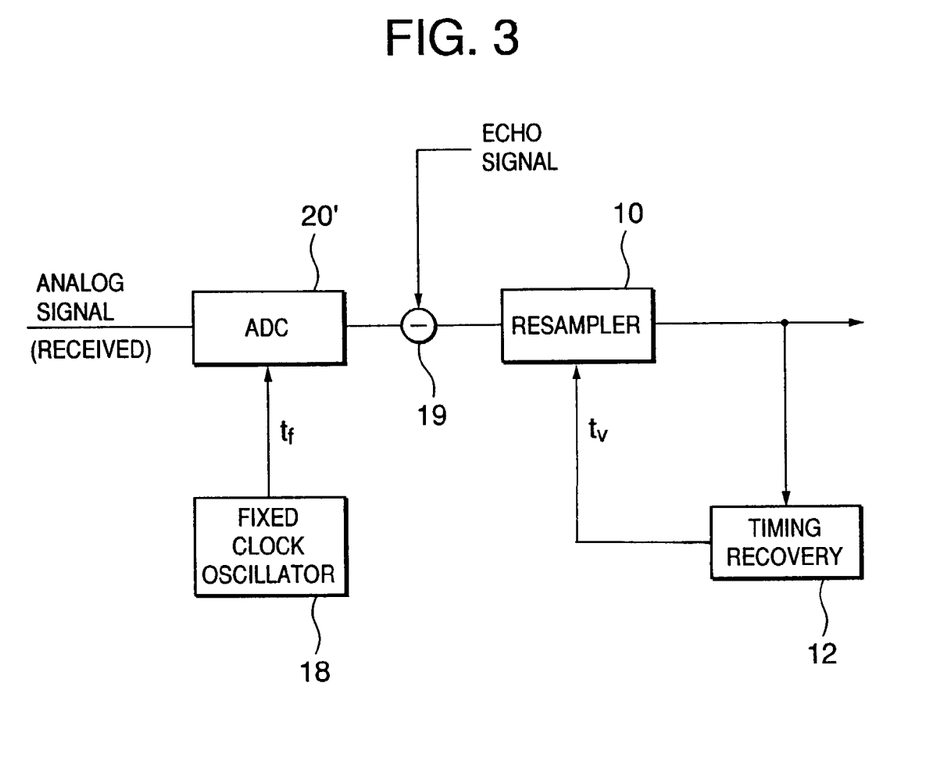
FIG. 3 is a diagram showing an AD converter in a receiving part of a modem to which the sampling system of the present invention is applied.

FIG. 3 shows an AD converter in a receiving part of a full-duplex modem to which one embodiment of the present invention is applied. As shown in FIG. 3, the receiving part of the modem includes an AD converter (ADC) 20' which converts a received analog signal into a digital signal. A fixed clock oscillator 18 outputs a fixed clock signal (tf) to the AD converter 20' so that the received analog signal is periodically sampled by the AD converter 20' in accordance with the fixed clock signal (tf). The signal output by the AD converter 20' is supplied to a first input of an echo canceler 19.

Generally, the analog signal which is received at the receiving part of the full-duplex modem may contain the components of a transmitted signal delivered by the transmitting part of the modem and echoed back to the received signal. It is necessary to eliminate the components of the transmitted signal from the received signal. An echo signal which is estimated from the transmitted signal delivered by the transmitting part of the modem is supplied to a second input of the echo canceler 19. The echo canceler 19 acts to eliminate the estimated echo signal from the digital signal at the output of the AD converter 20', and the resulting signal is supplied to a resampler 10.

In the receiving part of the full-duplex modem of FIG. 3, the resampler 10 outputs a sequence of samples, having a timing phase synchronized to a given arbitrary clock signal, based on the digital signal output by the echo canceler 19. The sampling system embodying the present invention is applied to the resampler 10. A timing recovery unit 12 generates an estimated timing signal based on the output signal of the resampler 10. The timing recovery unit 12 outputs a timing phase signal (tv) to the resampler 10.

In the receiving part of the modem of FIG. 3, the AD converter 20' requires only the fixed clock oscillator 18 which outputs a fixed clock signal (tf) to the AD converter 20'. It is not necessary that a variable clock oscillator which is constructed with an external logic circuit is asynchronously operated with the AD converter 20'. According to the sampling system of the present invention, it is possible that a clock signal is shared for the DA conversion in the transmitting part of the modem at the time of transmission and for the AD conversion in the receiving part of the modem at the time of receiving. In the transmitting part (not shown in FIG. 3) of the modem, a DA converter for the DA conversion at the time of transmission is operated synchronously with the fixed clock signal (tf) output by the fixed clock oscillator 18.

As previously described, in a conventional full-duplex modem, there is a problem in that the sampling rate "fsr" and its phase at the receiving part and the sampling rate "f'sr" and its phase at the transmitting part are generally not consistent. However, the sampling system of the above-described embodiment does not require an external logic circuit to obtain a clock signal with a precise timing phase for controlling the receiving part of the modem. Even when an AD converter which periodically samples an input signal at a fixed sampling period is incorporated in the receiving part of the modem, the sampling system of the above-described embodiment can provide a precise timing phase of the clock signal for the receiving part of the modem. The sampling system of the above-described embodiment makes it possible to share a clock signal with a precise timing phase for the DA conversion in the transmitting part of the modem at the time of transmission and for the AD conversion in the receiving part of the modem at the time of receiving.

In the sampling system of the above-described embodiment, the second sampler SW2 outputs a sequence of secondary samples by alternately taking the −T/4 phase shifted samples from the first lowpass filter LP1 and the +T/4 phase shifted samples from the second lowpass filter LP2 at a sampling period that is half the fixed sampling period T, the second sampler SW2 doubling the number of the samples output by the first sampler SW1. The interpolation circuit outputs at the fixed sampling period T a sequence of output samples by executing an interpolation of the sequence of secondary samples, the sequence of output samples having a timing phase synchronized to a given arbitrary clock signal. The sampling system of the above-described embodiment does not require an external logic circuit to obtain a clock signal with a precise timing phase for controlling the receiving part of the modem. Even when an AD converter which periodically samples an input signal at a fixed sampling period is incorporated in the receiving part of the modem, the sampling system of the above-described embodiment can provide a precise timing phase of the clock signal for the receiving part of the modem. The sampling system of the above-described embodiment makes it possible to share a clock signal with a precise timing phase for the DA conversion in the transmitting part of the modem at the time of transmission and for the AD conversion in the receiving part of the modem at the time of receiving.

The present invention is not limited to the above-described embodiment, and variations and modifications may be made without departing from the scope of the present invention.

Further, the present invention is based on Japanese priority application No. 10-131282, filed on Apr. 24, 1998, the entire contents of which are hereby incorporated by reference.

What is claimed is:

1. A sampling method comprising the steps of:
   periodically sampling an input signal at a fixed sampling period T to output a sequence of samples;
   outputting a sequence of −T/4 phase shifted samples from said sequence of samples;
   outputting a sequence of +T/4 phase shifted samples from said sequence of samples;
   outputting a sequence of secondary samples by alternately taking said −T/4 phase shifted samples and said +T/4 phase shifted samples at a sampling period that is half the fixed sampling period T, the number of the samples being thus doubled with the sequence of secondary samples; and
   outputting at the fixed sampling period T, a sequence of output samples by executing an interpolation of the sequence of secondary samples, the sequence of output samples having a timing phase synchronized to a given arbitrary clock signal.

2. The method of claim 1, wherein said phase shifted samples are generated by a low pass filter.

3. The method of claim 1, wherein said interpolation utilizes Lagrange's interpolation.

4. A sampling method comprising steps of:
   sampling an input signal at a fixed sampling period T to output a sequence of samples;
   outputting a first sequence of phase shifted samples from said sequence of samples;
   outputting a second sequence of phase shifted samples from said sequence of samples;
   outputting a sequence of secondary samples by combining said first and second sequence at a sampling period that is a ratio of sampling period T; and
   outputting at the fixed sampling period T, a sequence of output samples by executing an interpolation of the sequence of secondary samples, the sequence of output samples having a timing phase synchronized to a given arbitrary clock signal.

5. The method of claim 4, wherein said phase shifted samples are generated by a low pass filter.

6. The method of claim 5, wherein said low pass filter shifts the phase of said first sequence to −T/4.

7. The method of claim 5, wherein said low pass filter shifts the phase of said second sequence to +T/4.

8. The method of claim 4, wherein said combining of said first and second sequence occurs by alternating said first and second sequence.

9. The method of claim 4, wherein said interpolation utilizes Lagrange's interpolation.

* * * * *